(12) United States Patent
Krimbacher

(10) Patent No.: US 8,005,600 B2
(45) Date of Patent: Aug. 23, 2011

(54) METHOD AND DEVICE FOR CONTROLLING A DRIVE SYSTEM

(75) Inventor: Norbert Krimbacher, Satteins (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 1071 days.

(21) Appl. No.: 11/711,267

(22) Filed: Feb. 27, 2007

(65) Prior Publication Data

US 2007/0219694 A1    Sep. 20, 2007

(30) Foreign Application Priority Data

Feb. 27, 2006  (DE) .................. 10 2006 009 064

(51) Int. Cl.
*G06F 7/00* (2006.01)
(52) U.S. Cl. ........................................................ 701/54
(58) Field of Classification Search .............. 701/50–51, 701/54, 61–62, 93, 95; 60/431, 445, 448–449, 60/451
See application file for complete search history.

(56) References Cited

U.S. PATENT DOCUMENTS

| | | | |
|---|---|---|---|
| 2005/0027425 A1* | 2/2005 | Wang | 701/70 |
| 2005/0071067 A1* | 3/2005 | Guven et al. | 701/54 |
| 2006/0055234 A1* | 3/2006 | Choi et al. | 303/113.1 |
| 2008/0003113 A1* | 1/2008 | Krimbacher | 417/282 |

FOREIGN PATENT DOCUMENTS

| | | |
|---|---|---|
| DE | 19623738 | 12/1997 |
| DE | 19754916 | 6/1998 |
| DE | 10115797 | 10/2002 |

* cited by examiner

*Primary Examiner* — Kim T Nguyen
(74) *Attorney, Agent, or Firm* — Dilworth & Barrese, LLP

(57) ABSTRACT

The present invention generally relates to a method and a device for controlling a drive system, in particular a hydraulic traveling drive of a crane, a caterpillar, an industrial truck or a construction machine, which has at least one drive unit for an element to be driven. The invention relates to a control device for controlling such drive system, comprising a control signal circuit for providing an actuating signal for adjusting the at least one drive unit in dependence on a specified desired value of an output parameter as well as a specified power limit value for the at least one drive unit.

22 Claims, 3 Drawing Sheets

METHOD AND DEVICE FOR CONTROLLING A DRIVE SYSTEM

BACKGROUND OF THE INVENTION

The present invention generally relates to a method and a device for controlling a drive system, in particular a hydraulic traveling drive of a crane, a caterpillar, an industrial truck or a construction machine, which has at least one drive unit for an element to be driven. On the one hand, the invention relates to a method, in which a desired value of an output parameter as well as a power limit value for the at least one drive unit are specified and in dependence on the specified desired value of the output parameter and the specified power limit value at least one actuating signal is provided for the at least one drive unit. The invention in particular relates to a method, in which at least two separate drive units are provided for a left drive wheel and a right drive wheel, wherein one desired speed each is specified for the two wheels and in dependence on the specified desired speeds at least one actuating signal is provided for the drive units. Furthermore, the invention relates to a control device for controlling such drive system, comprising a control signal circuit for providing an actuating signal for adjusting the at least one drive unit in dependence on a specified desired value of an output parameter and a specified power limit value for the at least one drive unit. Finally, the invention relates to a crane, a caterpillar or a construction machine with such a control device.

Cranes, but also other construction machines, regularly have hydraulic drive systems with at least one closed hydraulic circuit, which has a hydraulic pump in combination with a hydraulic motor. By means of such hydraulic drive systems, various drive functions are realized for instance on cranes, and in particular hoisting winch drives, chain drives or wheel drives can be realized in this way. The hydraulic pump regularly is driven via a drive unit, such as an internal combustion engine. The hydraulic stream generated by the pump is translated into the corresponding actuating movement by the hydraulic motor coupled therewith. In order to control the corresponding actuating movement in a precise and stable way, the speed of the hydraulic motor must be controlled accordingly, the delivery rate of the hydraulic pump and the absorption volume of the hydraulic motor being adjustable, for instance by using adjustable swash plate designs of these components, but other designs are possible as well. On the one hand, a fast response of the system should be achieved with corresponding operating or control commands. On the other hand, operating the actuators too fast or overriding the same can lead to instabilities of the drive system.

Construction machines such as cranes, caterpillars and the like, which can have a wheel drive or also a chain drive, regularly are moved on grounds such as gravel tracks, loamy or gravelly grounds or generally soil without surface coating, which often involve an only insufficient traction. This involves the corresponding traction problems during acceleration and braking. To remedy these problems, differential locks frequently are used, which force the drive wheels or chains of the left track to be coupled mechanically with the drive wheels of the left track. However, this in turn involves problems during cornering, in particular on grounds with higher traction. The slip induced by differential locks leads to premature wear both of the driveable pavement and of the corresponding drive elements.

SUMMARY OF THE INVENTION

Proceeding therefrom, it is the object underlying the present invention to create an improved method and an improved device for controlling a drive system as mentioned above, which avoid the disadvantages of the prior art and develop the latter in an advantageous way. Preferably, an improved drive control should be created, which increases the efficiency of the drive, reduces wheel wear, and increases traction.

In accordance with the invention, this object is solved by a method, devices and crane or construction machine disclosed herein. Preferred aspects of the invention are also disclosed herein.

Thus, a control is proposed on the one hand, which effects an intelligent differential lock between a left drive wheel and a right drive wheel, which even during cornering prevents the driven wheels from being strained against each other and nevertheless ensures a speed coupling of the two wheels even in the case of traction problems. On the other hand, a control is proposed in accordance with a further aspect of the invention, which reliably prevents or limits a slip of a drive wheel or element and thereby increases the efficiency of the drive and reduces wear. In accordance with a first aspect of the present invention, the specified power limit value, in dependence on which the at least one actuating signal is provided for the at least one drive unit, is reduced in dependence on a matching of the specified desired value of the output parameter with a current actual value of said output parameter. If the difference between desired value and actual value of the output parameter exceeds a predetermined tolerance threshold, the power limit value is reduced correspondingly, whereby the actuating signal is corrected correspondingly.

In particular, said output parameter can be an output speed of the drive unit and thus a wheel speed, when the element to be driven is a traveling gear wheel. A traveling gear wheel can be a wheel rolling directly on the ground, when a wheel drive is provided. However, the traveling gear wheel can also be a drive wheel or pinion, over which runs a drive chain. Thus, when the difference between the desired speed and the actual speed of the respective drive wheel lies above an admitted tolerance value, the power limit value is reduced correspondingly, in order to correspondingly reduce the actuating signal for the drive unit. Slip can thus be prevented. Slip prevention can be achieved both during acceleration and during braking, in that as a power limit value a maximum power value for the power to be provided on the one hand and a maximum power value for the power to be recirculated on the other hand is reduced as described above in dependence on the matching between desired value and actual value of the output parameter.

Advantageously, said desired value of the output parameter is determined in dependence on the actual value of a corresponding output parameter of a further drive unit for a further element to be driven. If the output parameter is a wheel speed or an output speed of the drive unit, as mentioned above, it is possible in particular to determine the desired speed of the one drive unit, which drives the one wheel, in dependence on the actual value of the output speed of the other drive unit, which drives the other wheel. The control for avoiding a wheel slip, either spinning or blocking, thus is based on the principle that the actually occurring speeds are determined in advance. When driving straight ahead, the speeds of the wheels to be driven must be more or less identical, and when cornering, the speeds differ depending on the steering radius of the vehicle. Thus, proceeding from a measured actual speed of the right wheel the required desired speed of the left wheel can be calculated and vice versa. If the desired speed of a wheel determined thereby is too far away from the current actual speed of this wheel, this indicates that an inadmissible slip exists. As mentioned above, the power limit value which is included in the determination of the actuating signal thus is changed.

If the actual speed of the respective wheel falls below the desired speed determined as mentioned above including tolerance threshold, the maximum available braking power of the associated drive unit must be reduced, so that the wheel can resume speed. This is effected by temporarily reducing the specification of the maximum power to be recirculated of the corresponding drive unit.

However, if the actual speed of the respective wheel exceeds the desired speed determined as mentioned above including tolerance threshold, the maximum available power on this drive unit must be reduced, so that the wheel is braked again and can assume the desired speed. This is accomplished by reducing the specification of the maximum power output.

The restriction of the specified power values is maintained, until the speed of the respective drive wheel again lies within a predetermined tolerance threshold. Subsequently, the specified power values are reset to nominal values, which can be specified by superordinate units.

Alternatively or in addition to the determination of the desired value of the output parameter of the one drive unit in dependence on the actual value of the corresponding output parameter of the other drive unit, said desired value can also be determined in dependence on sensor signals which in particular represent the speed of the equipment driven by the respective drive element. In particular, said desired value of the output parameter of the drive unit to be controlled can be determined in dependence on the actual traveling speed, which in accordance with a development of the invention can be determined via a speed sensor on a non-driven wheel and/or an acceleration sensor and/or another velocity sensor. In this way it can be checked whether all the elements to be driven have a slip, in particular whether the entire vehicle is skidding. In particular, the special case of a bilateral blockage of both drive systems or of a bilateral spinning of both wheels can be detected therewith. If this is the case, the corresponding power specification for both drive units can be reduced simultaneously. Thus, both or all drive units are decelerated or accelerated automatically, in order to reach the substantially slip-free and hence efficient working range.

To achieve an optimum traction for cornering, it is provided in accordance with a further aspect of the present invention that in dependence on a steering angle for each wheel to be driven or for the associated drive unit a separate desired speed is specified and in dependence on the separate desired speeds for each drive unit separate actuating signals are provided. In this way, a rigid coupling of the drive wheels of the right side with the drive wheels of the left side can be enforced without achieving that the drive wheels are strained against each other. The inventive idea consists in that as a result of a known steering angle of the steering wheel or the steering wheels, the geometrical relations for correct cornering can be resolved and hence the required wheel speeds on the two driving wheels definitely can be calculated in advance and thus the corresponding desired speeds for the control circuits of the drive units can be specified. When driving straight ahead, both wheels must be driven with the same speed, whereas during cornering the outside wheel must be driven at a corresponding faster rate than the inside wheel. In both cases, desired speeds for the drive units on the right and on the left definitely are impressed, so that the right and left wheels in principle are coupled with each other like by a differential lock. If one of the two drive wheels would spin, for instance because the ground becomes too smooth to transmit the drive power, the drive power thereof is adjusted downward, as a fixed desired speed is specified. In dependence on the steering angle, a fixed ratio between the desired speed of the left and right wheels is specified. This cannot result in an excessive slip on grounds with poor adhesion, either an inadmissible increase in speed as a result of an excessive drive power or an insufficient speed as a result of an excessive braking power.

As mentioned above, the desired speed can for instance be determined in dependence on a traveling speed of the equipment, which can be determined via a speed sensor on a non-driven wheel, an acceleration sensor or some other velocity sensor, in order to overcome the problem also mentioned above that both driven wheels are spinning or braking too much on the right and on the left.

As a result of the aforementioned reduction of the power specifications, the actuating signals generated can be fed back correspondingly, in order to correspondingly limit or reduce the power produced by the respective drive unit and/or the power recirculated to the respective drive unit. In particular, hydraulic drive units preferably can be provided with a closed hydraulic circuit comprising a hydraulic pump and a hydraulic motor.

Advantageously, the respectively specified power value and the respective current power value are supplied to a controller, by which a superordinate control signal is provided, in dependence on which the actuating signal for the actuators of the hydraulic components is reduced or limited.

In accordance with an advantageous embodiment of the invention, the actuating signals for the hydraulic components of the hydraulic circuit are limited or reduced both in dependence on a specified power value for the power provided by the system and in dependence on a specified power value for the power recirculated into the system. In particular, the actuating signal can be limited and/or reduced on the one hand in dependence on a matching of the current pump power value with a specified maximum power value for the power to be provided and on the other hand in dependence on a matching of the current motor power value with a specified maximum power value for the power to be recirculated. This can ensure on the one hand that the power provided by the hydraulic circuit does not overshoot the mark, while it is achieved on the other hand that the braking torque provided by the hydraulic circuit is in correspondence with the power specifications provided therefor.

In principle, the actuating signals for the hydraulic components can be determined in dependence on various output parameters. In accordance with a development of the invention, the speed of the hydraulic motor can in particular be the output parameter in dependence on which the actuating signals are provided.

Advantageously, the actuating signal is generated in dependence on the signal of a controller to which the desired value and the actual value of said working parameter are supplied. In the case of the speed of the hydraulic motor, the actuating signal thus is generated by a speed controller and is then limited or reduced in the prescribed way.

In accordance with an advantageous development of the invention, the actuating signal can also be generated in dependence on a pilot control signal which is determined in dependence on the actual value of said output parameter and an actual value of an operating parameter of the hydraulic pump and/or the hydraulic motor. In particular, the pilot control can take into account the actual speed of the hydraulic pump. With a specified actual speed of the hydraulic pump on the one hand and a predetermined desired speed of the hydraulic motor on the other hand, the hydraulic circuit can be adjusted therefrom to a specific transmission ratio, which can be achieved via specific actuating signals.

Advantageously, the actuating signal circuit on the one hand comprises said pilot control and on the other hand the control mentioned above, so that the actuating signal is roughly specified via the pilot control, so to speak, and fine deviations can be compensated by means of the controller.

In accordance with a development of the invention, there is first provided a dimensionless actuating signal, which then is limited or reduced in dependence on the matching of the respectively specified power value with the associated current power value of the hydraulic circuit, and finally is supplied from a driving stage to the respective actuator of the hydraulic circuit.

BRIEF DESCRIPTION OF THE DRAWINGS

The invention will subsequently be explained in detail with reference to a preferred embodiment and associated drawings, in which.

DESCRIPTION OF THE PREFERRED EMBODIMENTS

Figure 1:
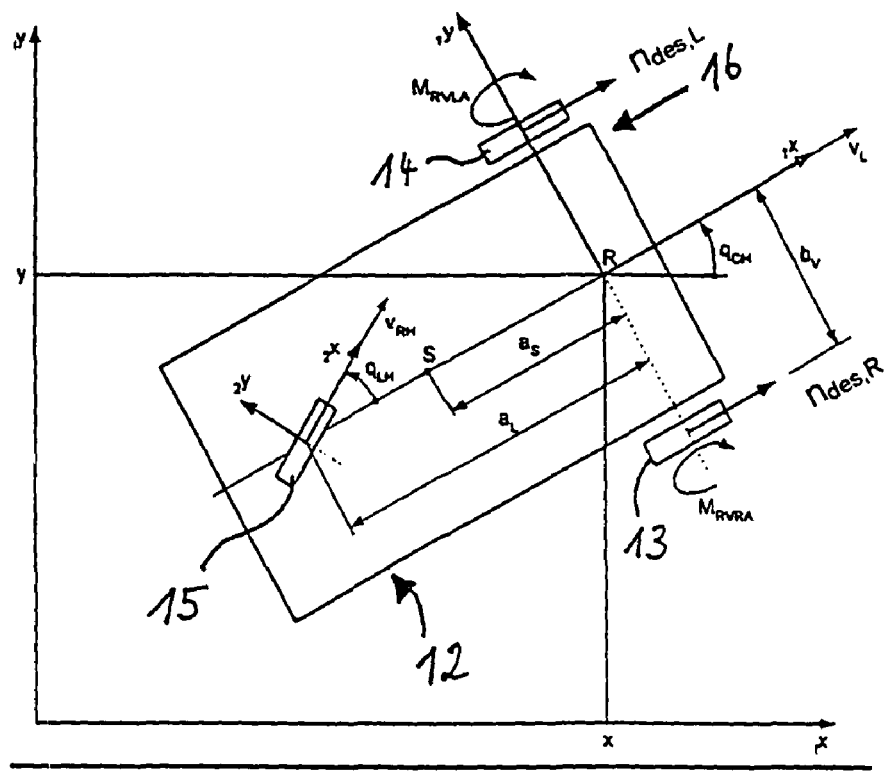
FIG. 1: shows a schematic top view of an industrial truck with a hydraulic traveling drive system with two driven wheels in accordance with a preferred embodiment of the invention.

FIG. 1 shows an industrial truck 12 in the form of a three-wheel fork lift truck, which has a right driven wheel 13 and a left driven wheel 14 as well as a steerable third wheel 15. It is to be understood that the invention can, however, also be implemented in other construction machines, such as cranes, caterpillars or the like, in particular that instead of the illustrated wheeled traveling gear 16 a tracked traveling gear or the like can also be provided.

Figure 2:
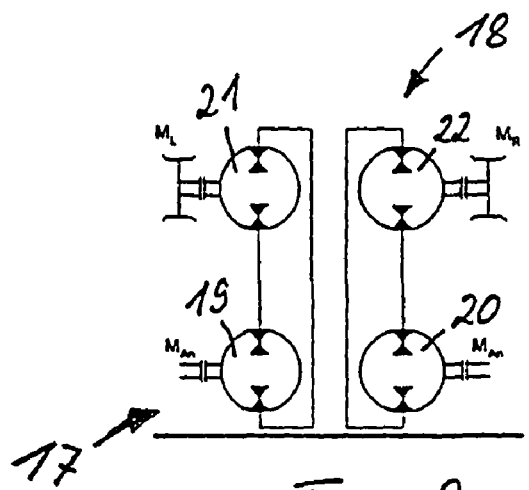
FIG. 2: shows a schematic representation of the two separate hydraulic drive units with one closed hydraulic circuit each for the left driven wheel and the right driven wheel of the industrial truck of FIG. 1, FIG. 3: shows a schematic representation of a sub-control device for controlling the drive units of FIG. 2, and FIG. 4: shows a schematic representation of a concrete formation of a controller for generating the actuating signals for the drive units of FIG. 2, by means of which the control illustrated in FIG. 3 is realized.

On the left and right front drive sides, the vehicle 12 as shown in FIG. 1 is driven separately by independent drive units 17 and 18, which advantageously can each constitute closed hydraulic circuits with one hydraulic pump 19, 20 and one hydraulic motor 21, 22 each, as shown in FIG. 2. Advantageously, the hydraulic pumps 19 and 20 can be driven by a common drive unit, preferably in the form of an internal combustion engine.

As shown in FIG. 1, the geometry for correct cornering can be resolved on the basis of a known steering angle $q_{LH}$ on the steering wheel 15, so that the required wheel speeds on the two wheels 13 and 14 to be driven can be calculated in advance and corresponding desired speeds $n_{des,R}$ and $n_{des,L}$ can be determined. Via a non-illustrated traveling speed sensor, the traveling speed of the vehicle 12 can be determined for this purpose, for instance the speed of the non-driven steering wheel 15 can be detected. By means of the illustrated geometrical relations, the corresponding desired speed of the left and right front wheels 13, 14 can be calculated.

The desired speeds $n_{des,R}$ and $n_{des,L}$ determined therefrom are supplied to a controller which generates therefrom actuating signals for the drive units 17 and 18, so that each wheel on the right and on the left is driven individually with the proper speed for the respective cornering. As for both drive units 17 and 18 separate desired speeds are specified or a fixed ratio between the two desired speeds is specified, the two wheels 13 and 14 are coupled with each other in terms of their speed, as it is the case with a differential lock; straining the two wheels against each other is, however, prevented, since different speeds are specified.

Figure 3:
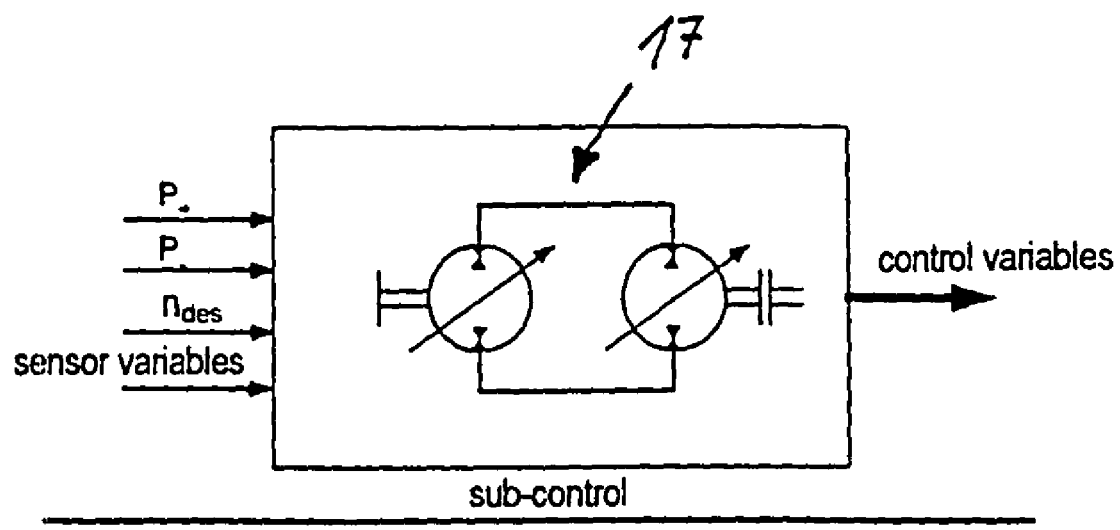

The actuation of the drive units 17 and 18 advantageously can be effected via a defined control structure as it is shown in FIG. 3. The illustrated subordinate controller can substantially be influenced by three parameters, which in combination with a superordinate concept can implement functionalities such as e.g. an anti-slip control (ASC) or an anti-lock braking system (ABS). As shown in FIG. 3, the variables supplied to the subordinate controller 23 include the desired speed $n_{des}$ on the output shaft, which as mentioned above can be specified separately for each wheel, then a power specification $P_+$, which corresponds to the maximum power supplied to the output shaft, and a further power specification $P_-$, which corresponds to the reverse power to be maximally recirculated to the drive. The furthermore illustrated sensor variables can for instance include signals of the travelling speed sensor, of respective speed sensors for detecting the actual speed of the two driven wheels 13 and 14, of an acceleration sensor and/or further velocity sensors or of a steering angle sensor for detecting the steering angle $q_{LH}$.

The fundamental realization of ABS or ASC now is based on the fact that the actually occurring speeds can be determined in advance. When driving straight ahead, the speeds must be more or less identical, when cornering, the speeds differ depending on the steering angle of the vehicle. Thus, proceeding from the measured speed of the right wheel, the required current speed of the left wheel can be calculated. If this speed of the left wheel now lies above or below a tolerance threshold, corresponding measures must be taken.

If the speed of the left wheel falls below the tolerance threshold (ABS), the maximum available braking power on the left drive side must be reduced, so that the wheel can resume speed. This is effected by temporarily reducing the specification of the maximum reverse power of the sub-control $P_-$.

If the speed of the left wheel exceeds the tolerance threshold (ASC), the maximum available power on the left drive side must be reduced, so that the wheel is braked again and can assume the desired speed. This is accomplished by reducing the specification of the maximum power output $P_+$ of the sub-control.

The restriction of the powers for the sub-controller is maintained, until the speed of the left wheel lies within the tolerance threshold. Subsequently, the corresponding powers are again set to the nominal values, which are specified by superordinate units.

This pattern likewise is used symmetrically for the right drive side.

By means of additional sensors, which can be used for determining the actual traveling speed (e.g. speed sensor on the third wheel, acceleration sensors, . . . ), it can be checked in addition whether the entire vehicle is skidding. In this way, the special case of a bilateral blockage of both drive systems or of a bilateral spinning of both wheels can be detected. Should this case occur, the corresponding maximum power specification can now be reduced simultaneously on both drive sides. Both drive wheels thus are decelerated or accelerated automatically, in order to reach the more efficient working range.

Figure 4:
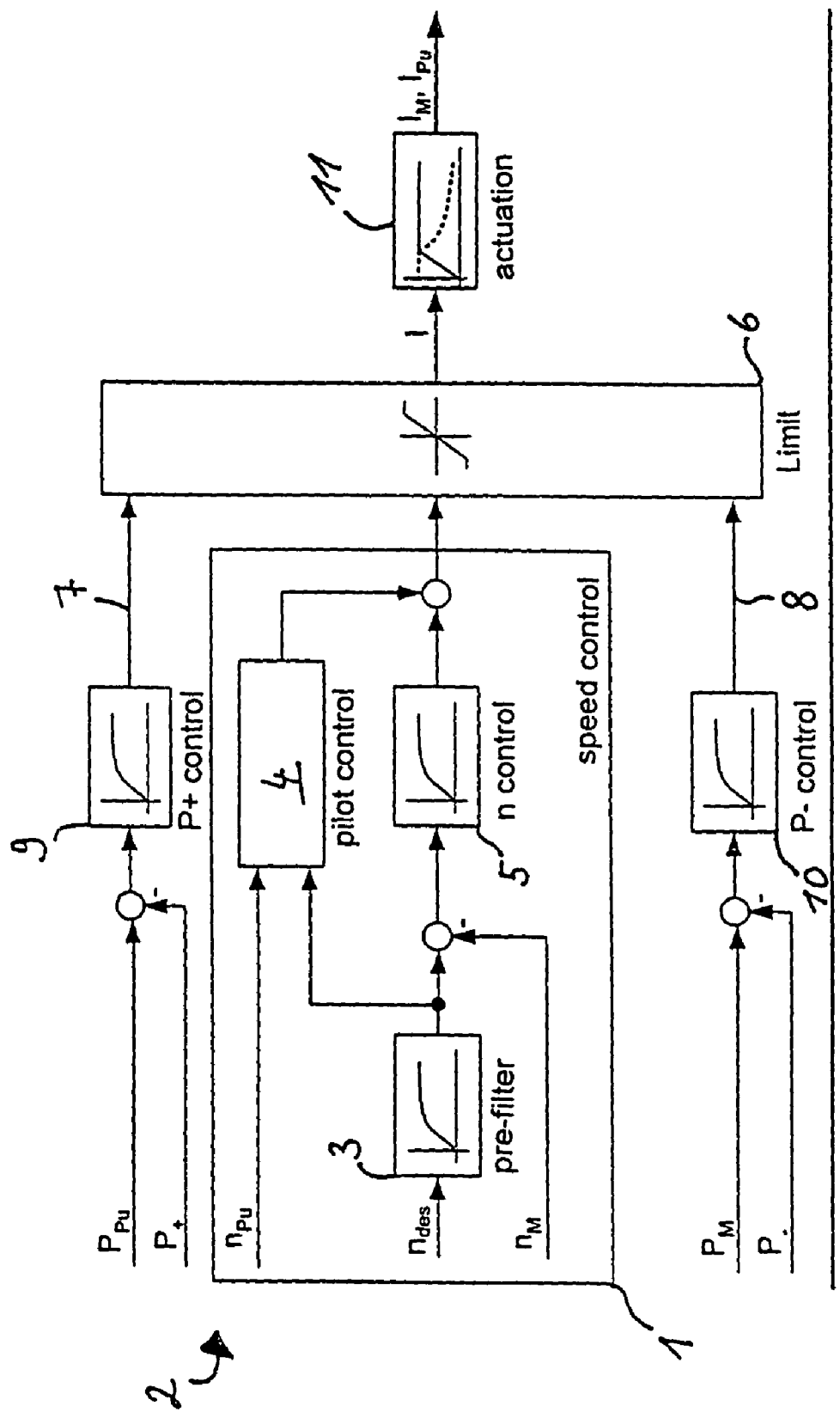

In concrete terms, the actuating signal generation can be effected as shown in FIG. 4. The control circuit portion 1 of the control device 2, which is shown in FIG. 4, is used for generating a dimensionless actuating signal I and constitutes a speed control in the illustrated embodiment. A desired speed $n_{des}$ of the hydraulic motor, which can be determined in dependence on various marginal conditions, is first passed through a pre-filter 3 and together with the actual speed $n_{Pu}$ of the hydraulic pump is supplied to a pilot control module 4, which via the known variables of the closed hydraulic circuit including pump size, motor size and speed or speed conditions calculates a dimensionless actuating signal I. On the other hand, the filtered signal $n_{des}$, which represents the desired speed of the hydraulic motor, is supplied to a speed controller 5 together with the actual speed $n_M$ of the hydraulic motor, in order to compensate corresponding deviations between actuating signal and speed achieved. From said pilot control and the speed control in combination, said dimensionless actuating signal I is generated.

This dimensionless actuating signal I is limited or reduced in a control module 6, namely in dependence on superordinate control signals 7 and 8, which come from corresponding superordinate power controllers 9 and 10.

To the superordinate power controller 9, the current power $P_{Pu}$ supplied to the hydraulic circuit is supplied on the one hand and on the other hand the specified power value $P_+$, which can be matched with each other by the controller 9. The specified power value $P_+$ can be determined as described above and can for instance be fixed as the maximum available power of the drive unit. If the current power value $P_{Pu}$ exceeds the specified power value $P_+$, the dimensionless control signal I generated is reduced correspondingly by the control module 6, so that the actuators of the hydraulic pump and of the hydraulic motor are not run into actuating regions which would make the current power $P_{Pu}$ greater than the specified power $P_+$.

Laterally reversed, so to speak, a matching is effected of the power $P_M$ each currently recirculated on the hydraulic motor with a correspondingly specified power value $P_-$, which can likewise be determined in various ways as described above and can be fixed for instance as the maximum braking torque which the hydraulic motor should not exceed.

The specified power values $P_+$ and $P_-$ are reduced as mentioned above in dependence on a matching of the respectively specified desired speed of the right wheel 13 or the left wheel 14 with the real actual speed each. In concrete terms, the power $P_+$ to be output maximally at the output shaft is reduced, when an excessive spinning of the respective wheel relative to the specified desired speed is detected. The power $P_-$ to be recirculated maximally to the drive unit is reduced, however, when it is detected that the respective wheel is blocked or the speed of the respective wheel stays back excessively behind the specified desired speed.

The invention claimed is:

1. A method for controlling a drive system, which has at least one drive unit (17, 18) for an element (13, 14) to be driven, comprising:
specifying a desired value ($n_{des,R}$; $n_{des,L}$) of an output parameter as well as a power limit value ($P_+$; $P_-$) for the drive unit (17; 18);
providing by a control circuit in dependence on the specified desired value ($n_{des,R}$; $n_{des,L}$) of the output parameter and of the specified power limit value ($P_+$; $P_-$) at least one actuating signal (I) for the drive unit (17; 18); and
reducing by a control module the specified power limit value ($P_+$; $P_-$) in dependence on a matching of the specified desired value ($n_{des,R}$; $n_{des,L}$) of the output parameter with a current actual value of said output parameter,
wherein the output parameter is at least one of an output speed of the drive unit and a speed of a wheel to be driven.

2. The method as claimed in claim 1, wherein the element to be driven is a traveling gear wheel (13; 14).

3. The method as claimed in claim 1, wherein the desired value ($n_{des,R}$; $n_{des,L}$) of the output parameter is determined in dependence on an actual value of an output parameter of a further drive unit (18; 17) for a further element (14; 13) to be driven.

4. The method as claimed in claim 3, wherein the two elements (13; 14) to be driven are traveling gear wheels of preferably different traveling gear tracks and the desired speed ($n_{des,L}$) of the one traveling gear wheel (13; 14) is determined in dependence on the actual speed of the other traveling gear wheel (14; 13).

5. The method as claimed in claim 4, wherein the desired speed ($n_{des,R}$; $n_{des,L}$) of the one traveling gear wheel is determined in dependence on a steering angle ($q_{LH}$).

6. The method as claimed in claim 1, wherein the desired value ($n_{des,L}$; $n_{des,R}$) of the output parameter is determined in dependence on a speed of equipment moved by the element to be driven.

7. The method as claimed in claim 1, wherein the at least one drive unit (17, 18) comprises a closed hydraulic circuit with a hydraulic pump (19, 20) and a hydraulic motor (21, 22) and the at least one actuating signal is provided for adjusting at least one of the hydraulic pump (19, 20) and the hydraulic motor (21, 22), for adjusting at least one of a delivery rate of the hydraulic pump and an absorption volume of the hydraulic motor.

8. The method as claimed in claim 1, wherein the at least one actuating signal (I) is reduced by a superordinate control module (6) in dependence on a matching of the specified power limit value ($P_+$; $P_-$) with a current power value ($P_{Pu}$; $P_M$) of the drive unit (17, 18).

9. The method as claimed in claim 8, wherein the specified power limit value ($P_+$; $P_-$) and the current power value ($P_{Pu}$; $P_M$) are supplied to a controller (9; 10) which provides a superordinate control signal (7; 8), in dependence on which the actuating signal (I) is at least one of reduced and limited.

10. The method as claimed in claim 1, wherein the actuating signal (I) is at least one of limited and reduced on the one hand in dependence on a matching of a current pump power value ($P_{Pu}$) with a specified maximum power value for the power to be provided and on the other hand in dependence on a matching of a current motor power value ($P_M$) with a specified maximum power value for the power to be recirculated.

11. The method as claimed in claim 1, wherein the actuating signal (I) is provided in dependence on a signal of a controller (5) to which the specified desired value and the current actual value of said output parameter ($n_{des}$, $n_M$) are supplied.

12. The method as claimed in claim 1, wherein the output parameter is a speed of a hydraulic motor.

13. The method as claimed in claim 1, wherein the actuating signal (I) is provided in dependence on a pilot control signal, which is determined in dependence on the specified desired value ($n_{des}$) of said output parameter and the current actual value ($n_{Pu}$; $n_M$) of an operating parameter of at least one of a hydraulic pump and a hydraulic motor.

14. The method as claimed in claim 13, wherein the operating parameter is an actual speed ($n_{Pu}$) of the hydraulic pump.

15. The method as claimed in claim 1, wherein the actuating signal (I) first is provided dimensionless, then is at least one of limited and reduced in dependence on a matching of the specified power limit value ($P_+$; $P_-$) with at least one of a current pump power value and a current motor power value, and then is supplied by a driving stage (11) to an actuator of a closed hydraulic circuit.

16. The method as claimed in claim 1, wherein a driving stage (11) provides an actuating signal ($I_M$) for a hydraulic motor and an actuating signal ($I_{Pu}$) for a hydraulic pump.

17. The method as claimed in claim 1, wherein for a further drive unit (17; 18) at least one actuating signal (I) is provided in dependence on a desired value of an output parameter of this further drive unit and a specified power limit value ($P_+$; $P_-$) for this further drive unit (17; 18), the specified power limit value (P+; P−) being reduced in dependence on a matching of the desired value ($n_{des,R}$; $n_{des,L}$) of the output parameter of this further drive unit (17; 18) with an actual value of this output parameter of the further drive unit.

18. The method as claimed in claim 17, wherein the desired value ($n_{des,R}$; $n_{des,L}$) of the output parameter of the further drive unit (17; 18) is determined in dependence on the current actual value of the output parameter of the first-mentioned drive unit (17; 18).

19. The method as claimed in claim 1, wherein separate desired speeds ($n_{des,R}$; $n_{des,L}$) are determined in dependence on a desired traveling speed.

20. The method as claimed in claim 19, wherein the actuating signals each are determined in dependence on specified desired speeds ($n_{des,L}$, $n_{des,R}$) and a respectively specified power limit value ($P_+$; $P_-$), the respectively specified power limit value ($P_+$; $P_-$) being reduced in dependence on a matching of a respective desired speed ($n_{des,R}$; $n_{des,L}$) with a respective current actual speed of a respective wheel (13; 14).

21. A control device for controlling a drive system, which has at least one drive unit (17; 18) for an element (13; 14) to be driven, with a control circuit for providing at least one actuating signal for the at least one drive unit in dependence on a desired value of an output parameter as well as a power limit value for the at least one drive unit (17; 18), and comprising a control module for reducing the power limit value in dependence on a matching of the specified desired value of the output parameter with a current actual value of the output parameter, wherein the output parameter is at least one of an output speed of the drive unit and a speed of a wheel to be driven.

22. A crane, caterpillar, industrial truck or construction machine including a control device comprising at least one drive unit for an element to be driven, with a control circuit for providing at least one actuating signal for the at least one drive unit in dependence on a desired value of an output parameter as well as a power limit value for the at least one drive unit, and comprising a control module for reducing the power limit value in dependence on a matching of the specified desired value of the output parameter with a current actual value of the output parameter, wherein the output parameter is at least one of an output speed of the drive unit and a speed of a wheel to be driven.

\* \* \* \* \*